(12) United States Patent
Detwiler

(10) Patent No.: US 7,841,177 B1
(45) Date of Patent: Nov. 30, 2010

(54) OCEAN ELECTRICITY GENERATOR

(76) Inventor: Donald M. Detwiler, 254 Brookmead Rd., Wayne, PA (US) 19087

( * ) Notice: Subject to any disclaimer, the term of this patent is extended or adjusted under 35 U.S.C. 154(b) by 0 days.

(21) Appl. No.: 12/456,089

(22) Filed: Jun. 11, 2009

Related U.S. Application Data

(60) Provisional application No. 61/073,134, filed on Jun. 17, 2008, provisional application No. 61/133,813, filed on Jul. 3, 2008, provisional application No. 61/134,777, filed on Jul. 14, 2008, provisional application No. 61/196,923, filed on Oct. 22, 2008.

(51) Int. Cl.
*F03B 13/12* (2006.01)
(52) U.S. Cl. .......................... 60/497; 290/53
(58) Field of Classification Search .................. 290/53; 60/497
See application file for complete search history.

(56) References Cited

U.S. PATENT DOCUMENTS

| | | | | |
|---|---|---|---|---|
| 884,080 A | * | 4/1908 | Fallis | 60/507 |
| 1,061,061 A | * | 5/1913 | Frame | 60/505 |
| 1,393,472 A | * | 10/1921 | Williams | 290/42 |
| 1,864,499 A | * | 6/1932 | Grigsby | 74/130 |
| 2,749,085 A | * | 6/1956 | Searcy | 60/505 |
| 2,783,022 A | * | 2/1957 | Salzer | 60/505 |
| 3,515,889 A | * | 6/1970 | Kammerer | 290/53 |
| 3,930,168 A | * | 12/1975 | Tornabene | 290/53 |
| 4,184,335 A | * | 1/1980 | Byrne | 60/496 |
| 4,184,336 A | * | 1/1980 | Lamberti | 60/507 |
| 4,455,824 A | * | 6/1984 | Dabringhaus | 60/507 |
| 4,599,858 A | * | 7/1986 | La Stella et al. | 60/497 |
| 4,622,473 A | * | 11/1986 | Curry | 290/53 |

FOREIGN PATENT DOCUMENTS

| | | | | |
|---|---|---|---|---|
| FR | 639978 A | * | 7/1928 | |
| FR | 872125 A | * | 5/1942 | |
| WO | WO 8100284 A | * | 2/1981 | |

\* cited by examiner

*Primary Examiner*—Joseph Waks
(74) *Attorney, Agent, or Firm*—John F. A. Earley, III; Frank J. Bonini, Jr.; Harding, Earley, Follmer & Frailey, P.C.

(57) ABSTRACT

An apparatus for producing electricity from moving water, such as ocean waves, by converting the wave motion to electricity, the apparatus including a platform, structural tubes, a piston and a float base, where the electricity producing devices may be located on the platform and may be protected from the elements. The wave movement, up and down, between crest and trough causes movement of the piston, and the movement may be used to generate electricity when the piston is coupled with one or more electrical generating devices, such as a generator.

18 Claims, 9 Drawing Sheets

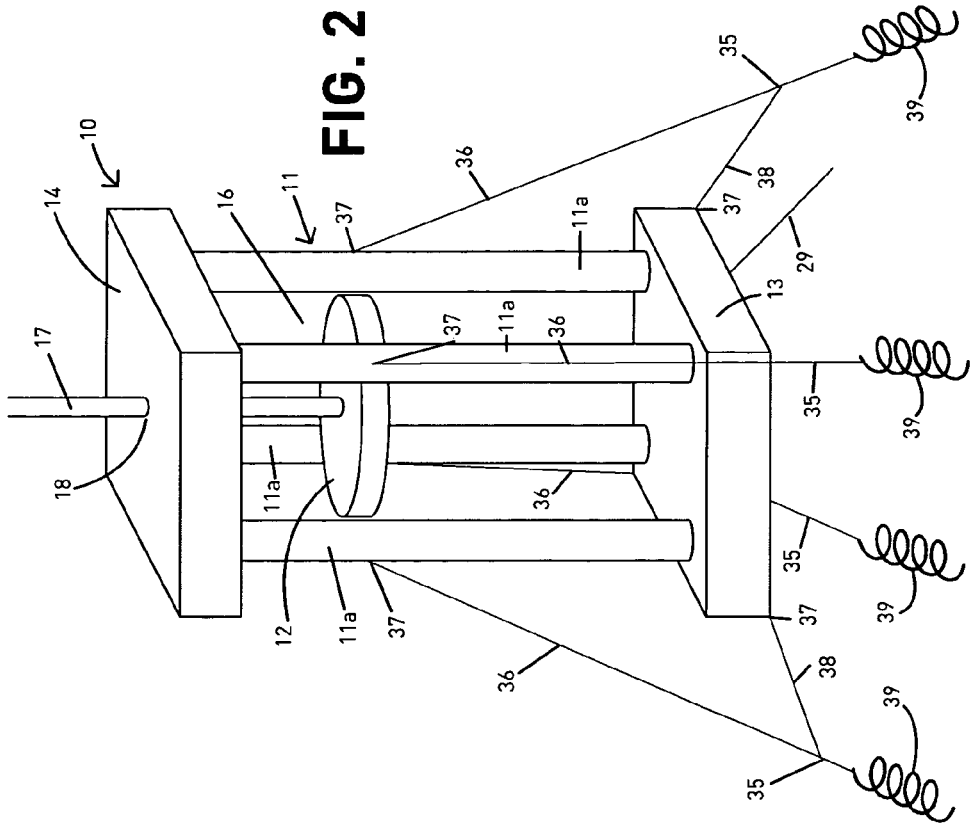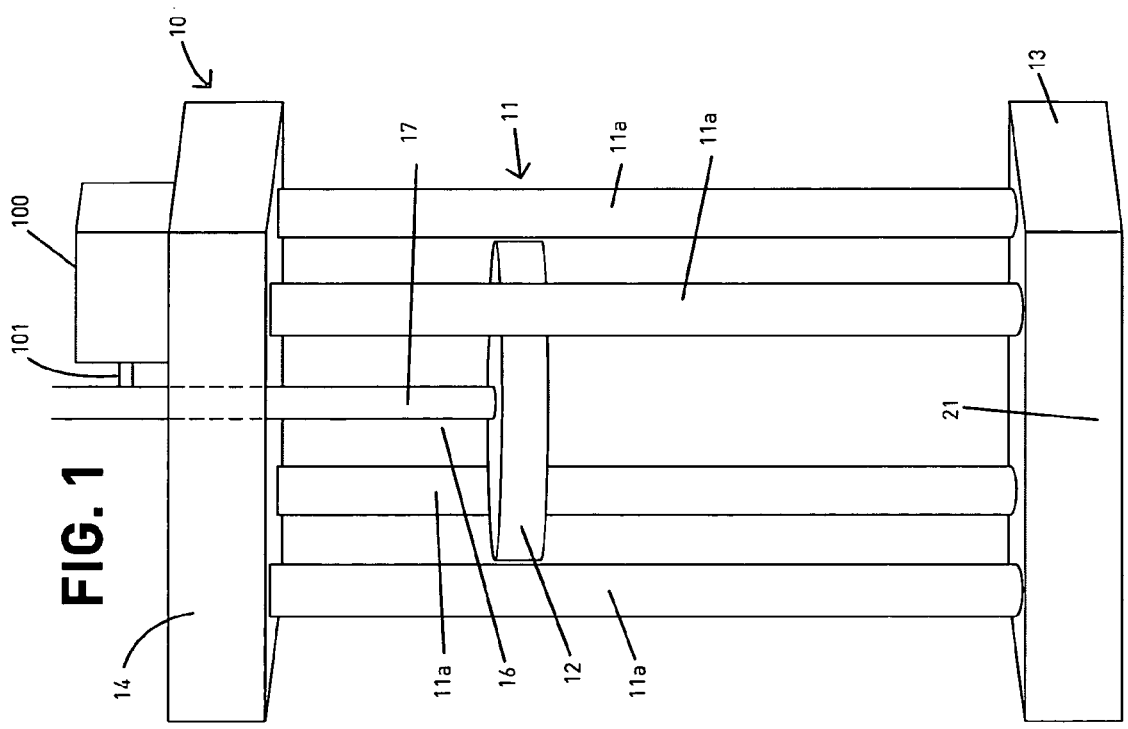

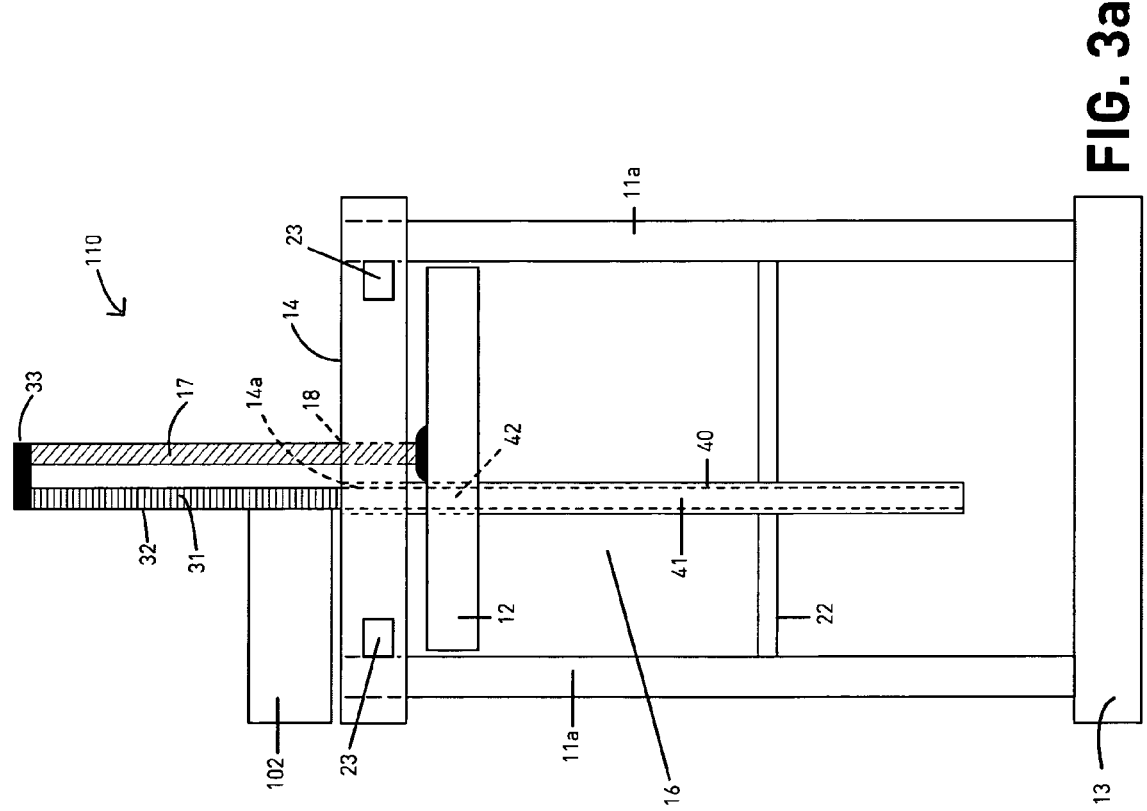

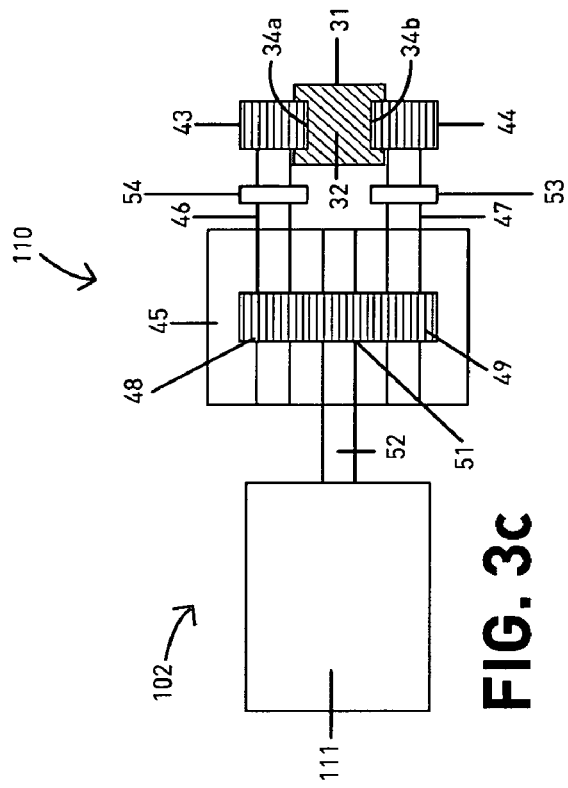
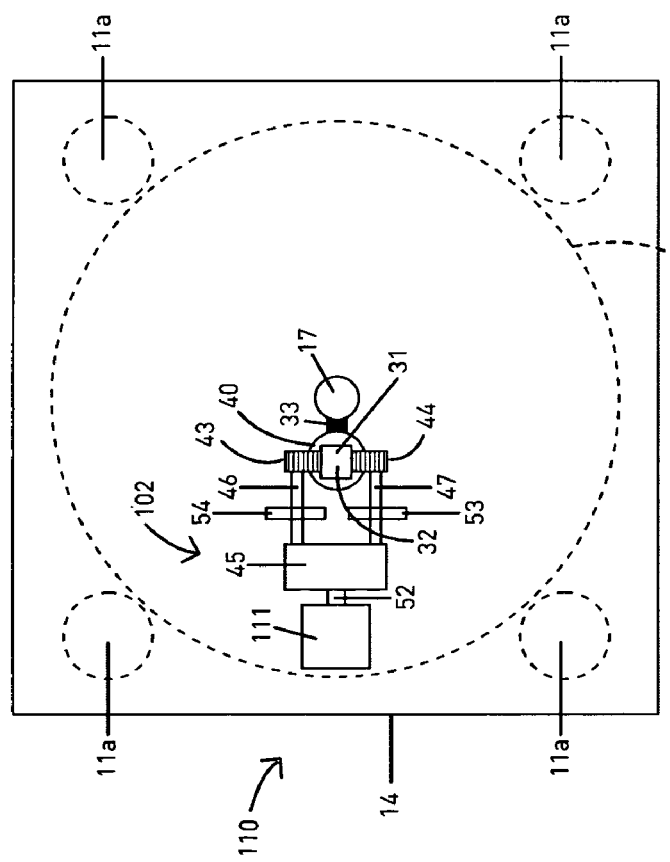

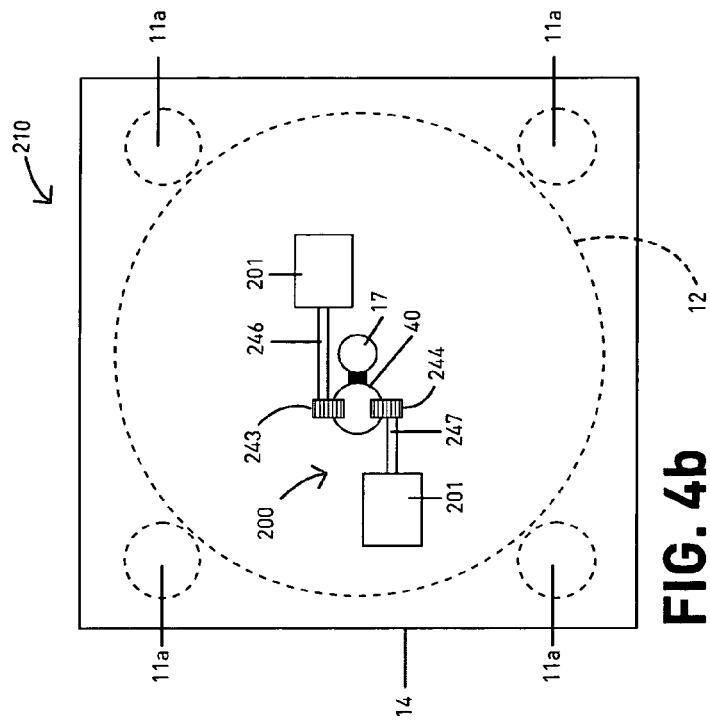
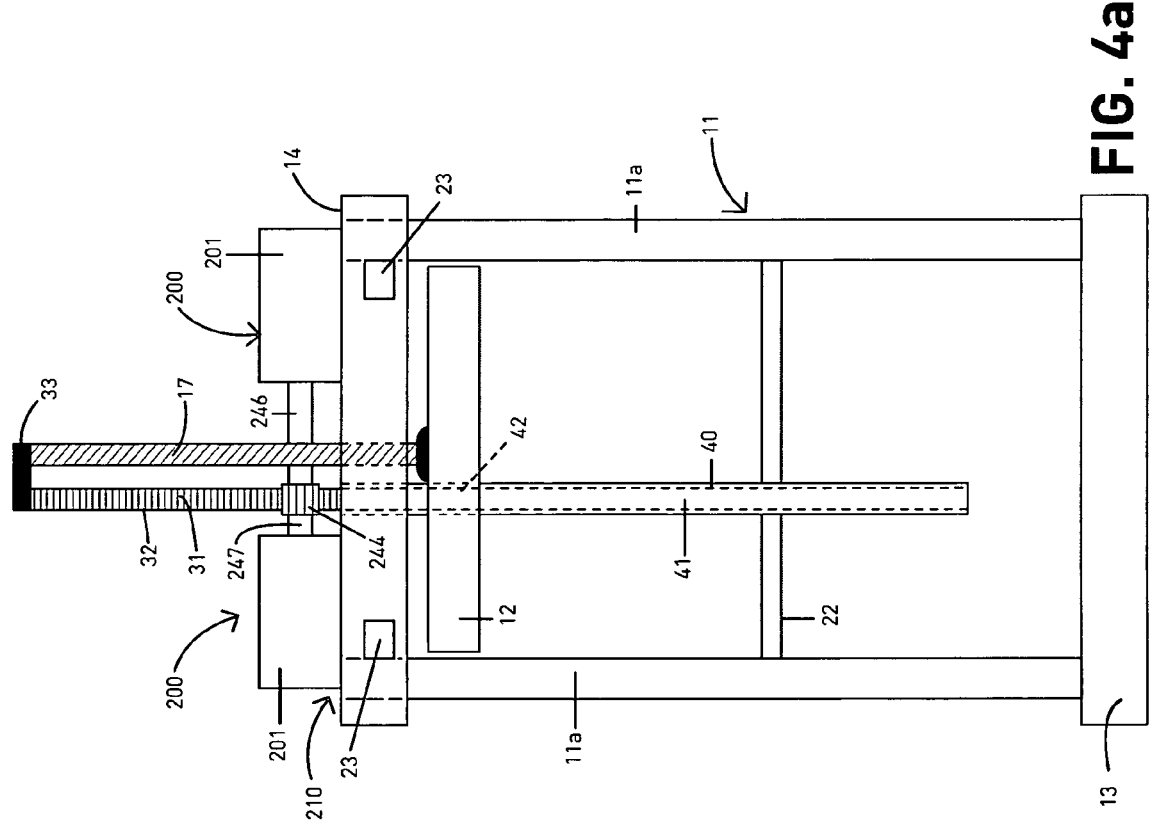

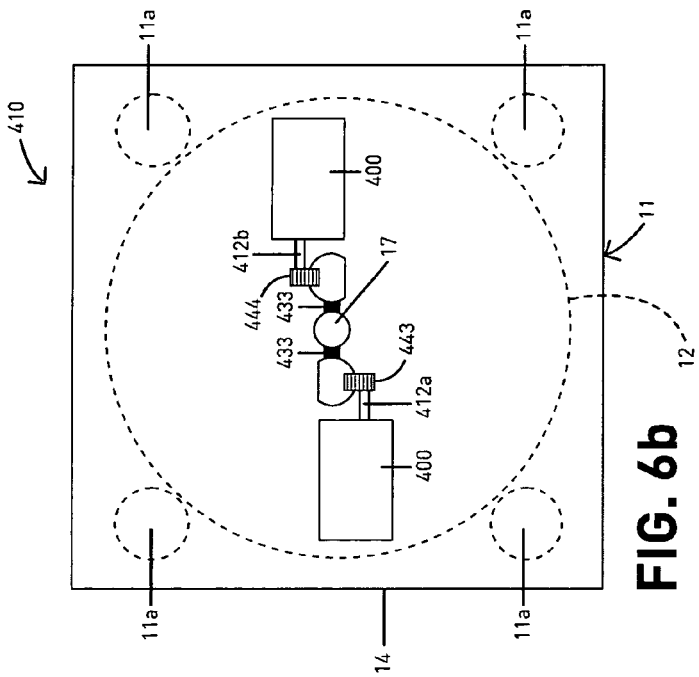
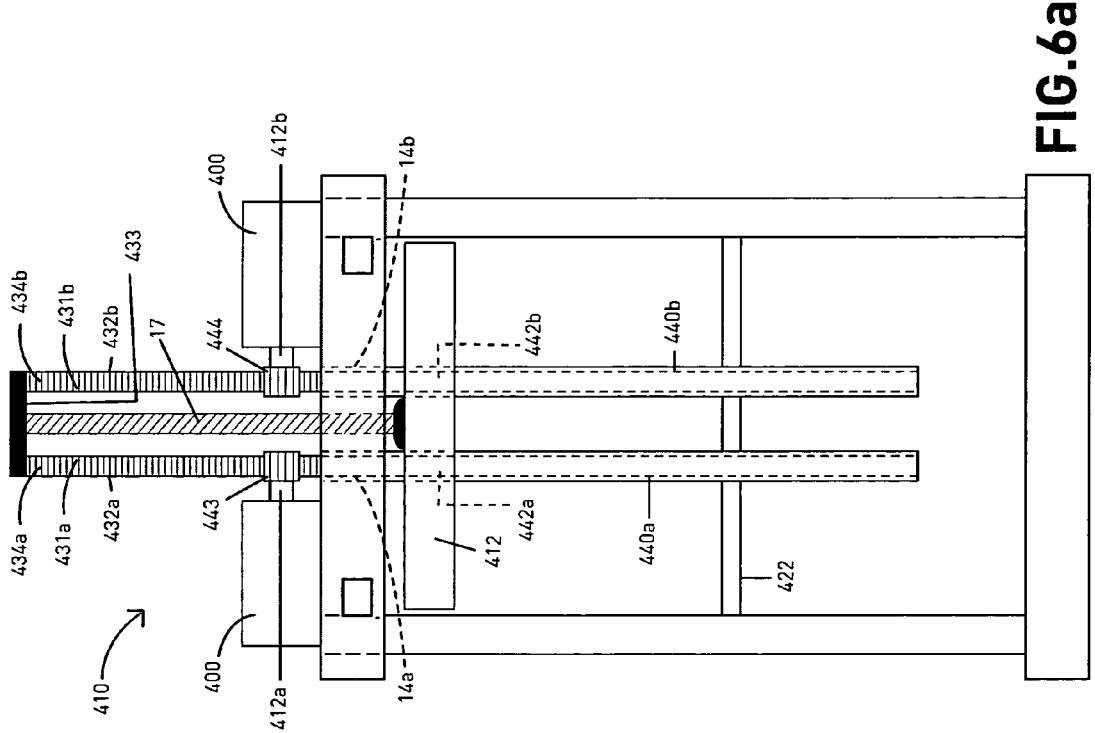

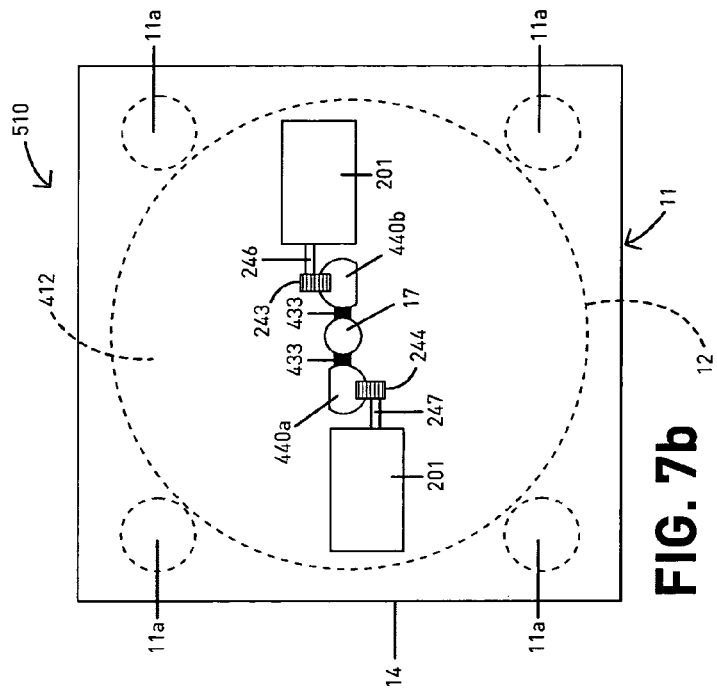
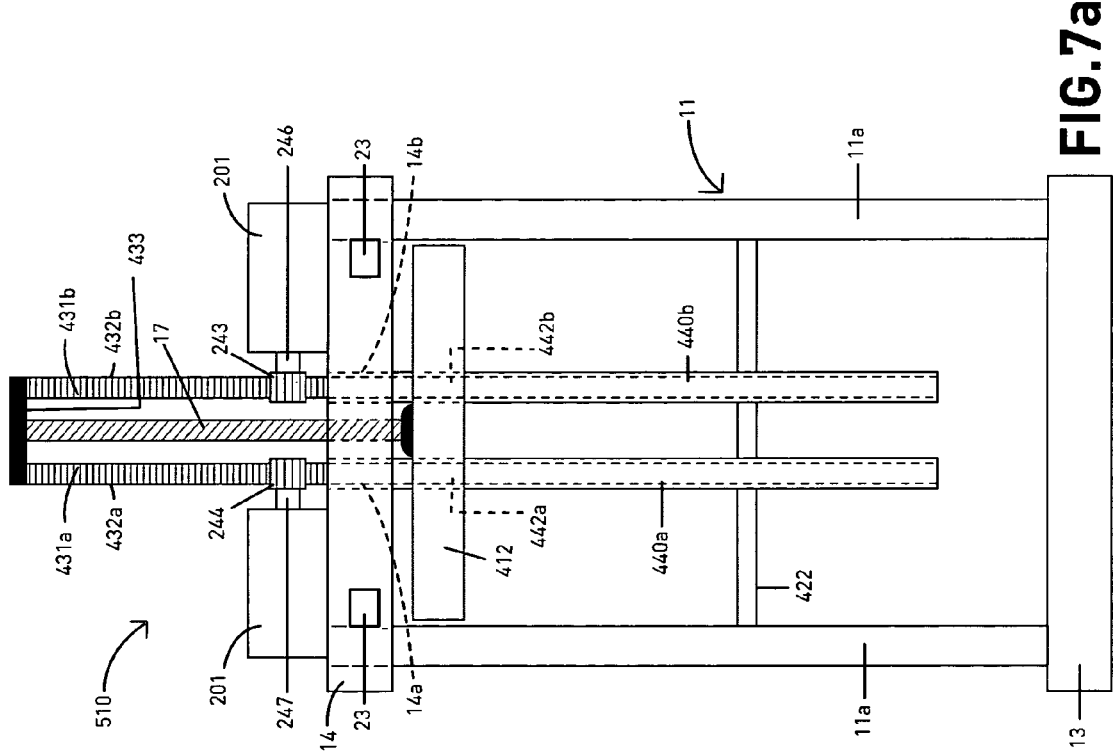

OCEAN ELECTRICITY GENERATOR

CROSS-REFERENCE TO RELATED APPLICATIONS

The present invention claims priority to the following U.S. Provisional Patent Applications, the complete disclosures of which are herein incorporated by reference: Ser. No. 61/073,134, filed Jun. 17, 2008; Ser. No. 61/133,813, filed Jul. 3, 2008; Ser. No. 61/134,777, filed Jul. 14, 2008; and Ser. No. 61/196,923, filed Oct. 22, 2008.

BACKGROUND OF THE INVENTION

1. Field of the Invention

The field of the invention relates to devices for generating electricity, and more particularly, devices for generating electricity from the movement of a body of water, such as, waves of an ocean.

2. Brief Description of the Related Art

Energy is widely used and is generally produced from a number of resources. The demand for energy has increased as the world population has grown and as countries and industries within those countries become more developed, and individual and industries increase their uses and demands for energy consumption. Natural resources, such as, for example, coal, oil and gas deposits generally are extracted from the earth. However, the demands on natural resources have increased, and these resources, once utilized, are not renewable. That is, further extractions of additional gas, oil and coal must be removed from the earth in order to continue to supply the energy required. An alternate natural resource of wind has been contemplated and implemented to generate energy. In order to utilize wind as a source of energy, generally rotor blades are connected to a turbine so that when the rotor blades are acted on by the movement of wind they in turn cause the turbine to rotate so that electricity may be generated.

A need exists for an apparatus that can provide energy in a manner that conserves resources and produces energy, such as ocean energy, in an economical manner.

SUMMARY OF THE INVENTION

An ocean electricity generator is provided that harnesses energy from the movement of a body of water, such as, for example, an ocean, and transforms that movement into electricity. The invention is designed to produce electricity from ocean waves.

Some of the main characteristics and advantages of using a "hole in the piston" configuration, as is described and shown in connection with embodiments of my invention, include a) easy access of the device components for maintenance, b) increased weather resistance (e.g., by minimizing the effect of wind and other elements on the device and its components), c) allows for lowering of the height of the device structure, and d) makes it easier to provide a lubrication system for the device and its components.

According to a preferred embodiment, the devices according to the invention are configured with a piston that is moved by the water in which it is placed. The piston is adapted to connect to a generator, so that the movement of the piston may be used to generate electricity.

According to preferred embodiments, a platform is provided to hold the piston and the generator, and the platform is secured to a location within a body of water.

According to preferred embodiments, the device is configured to harness the energy from the movement of the water acting on the piston. Preferably, the device is constructed so that the piston movement in either direction (e.g., an upstroke or downstroke) may impart movement to generate electricity by operating the generator. According to preferred embodiments, the device is configured to maximize the generating of electricity by transmitting movement from the piston during upward and downward piston travel.

The device may be configured with an installation feature that facilitates securing the device to an underwater structure or floor, such as, for example, an ocean floor.

According to preferred embodiments, the device includes a generator mechanism with a generator, and may transmit electric current through an electric cable. The cable for example, may be provided from the generator to a point remote from the generator, such as, for example, a power station on land. The electric power generated with the device may be stored (e.g., in a battery) or transmitted for use.

The device is configured to be placed in a water environment, and preferably in an ocean, off-shore, where ocean swells and waves are significant so that the ocean movement causes the piston to move (e.g., up and down).

Some preferred embodiments of the device include a generator, which may, for example, be configured as a linear generator, a rotary generator or as a start/stop rotary generator which changes direction for each time the piston changes direction.

These components work together when the piston goes up and down on the ocean waves. The waves push up the drive shaft which is connected to a generator. When the piston is going up or down, the piston will have force in both directions to produce electricity. The drive shaft will reverse each time the piston will change direction, but will generate electricity in both directions. According to preferred embodiments, the float base will be a water tight cubic square (possibly a round cylinder) to support the structure above the float base. The float base will have sufficient buoyancy to support the structure and to keep sufficient pressure on the tether cables which support the surface platform at a given level above the ocean. From the platform, an electricity cable will lay on the ocean bottom to the shore.

According to preferred embodiments, the device may be configured as follows.

The primary structure consists of a steel float base, four steel tubes and a steel platform.

The platform will be above the ocean level

The steel float base is water tight and used to float the structure

The four tubes are water tight and are part of the structure float

The piston will be water tight

The piston is free to rise and fall with the ocean waves within the constraints of the steel tubes Easily accessibility to maintain the electricity producing devices According to preferred embodiments, this invention is based on a floating structure with 4 (possibly 3) metal tubes that connect the float base to the platform. The metal tubes will also be useful in the buoyancy of the total structure. The float base is water tight and the metal tubes are also water tight thus supporting the platform which will be a steel plate having these sides extended to form a rigid surface for the devices. The piston will be placed within the tubes so it will move freely up and down as the waves move up and down. Connected to the piston will be a drive shaft which connects to a generator. When the driving shaft is going up or down, the connected shaft will produce electricity. The design of the structure will lend itself to multiple methods to produce electricity.

BRIEF DESCRIPTION OF THE DRAWING FIGURES

FIG. 1 is a schematic diagram of an illustration of my invention showing an ocean electricity generator device configured to operate a generator to produce electricity.

FIG. 2 is a perspective view of an illustration of the ocean electricity generator device of FIG. 1 showing a preferred tethering system for securing the device to a structure such as the ocean floor, and further showing a power cable.

FIG. 3A is a front elevation view of a preferred alternate embodiment of an ocean electricity generator according to my invention.

FIG. 3B is an enlarged top plan view of the ocean electricity generator shown in FIG. 3A, illustrated without the slide and rack.

FIG. 3C is an enlarged top plan view of the ocean electricity generator shown in FIG. 3A, showing the generator, transmission, gears and rack separate from the other components.

FIG. 4A is a front elevation view of another preferred alternate embodiment of an ocean electricity generator according to my invention.

FIG. 4B is an enlarged top plan view of the ocean electricity generator shown in FIG. 4A.

FIG. 6A is a front elevation view of another preferred alternate embodiment of an ocean electricity generator according to my invention.

FIG. 6B is an enlarged top plan view of the ocean electricity generator shown in FIG. 6A.

FIG. 7A is a front elevation view of another preferred alternate embodiment of an ocean electricity generator according to my invention.

FIG. 7B is an enlarged top plan view of the ocean electricity generator shown in FIG. 7A.

DETAILED DESCRIPTION OF THE PREFERRED EMBODIMENTS

Figure 5B:
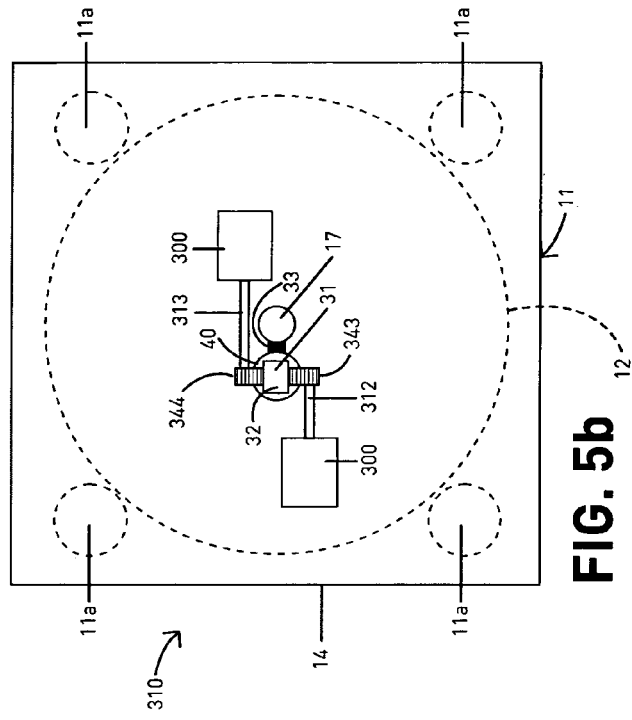
FIG. 5B is an enlarged top plan view of the ocean electricity generator shown in FIG. 5A.

Referring to FIG. 1, there is illustrated a schematic diagram of a first embodiment of an ocean electricity generator device 10 for generating electricity from the movement of water when placed in a water environment, such as, for example, an ocean. The movement of the water, such as waves and currents of an ocean, imparts movement on components of the device 10 to operate a generator 100 which is schematically represented in FIG. 1.

Referring to FIG. 1, the ocean electricity generator device 10 is schematically illustrated having a frame 11 that is designed to be placed in a water environment, such as an ocean (not shown). The device 10 includes a piston 12 that is supported on the frame 11 and is designed to ride along the frame 11. According to a preferred embodiment, the frame 11 is comprised of four tubes 11a, which preferably are constructed from stainless steel. The frame 11 preferably is configured with a stabilizing member illustrated comprising a base 13. The base 13 is constructed from a material which is buoyant so that the base 13 preferably comprises a floating member. The base 13, for example, may be constructed from a water tight material that surrounds an air space, a foam material, or other buoyant material. Alternatively, the base 13 may be constructed from a material which itself may be buoyant. According to an alternate embodiment, the base 13 may be constructed from a water tight corrosion resistant material, such as metal or stainless steel, and may enclose a volume of air, gas, foam or other suitable material to facilitate buoyancy. According to preferred embodiments, the piston 12 may be configured as a water tight rectangular cube, or alternately, a round cylinder. The buoyancy of the base 13 supports the other components of the device 10 and buoyantly maintains the device 10 in the water environment to maintain sufficient tension on the securing components (such as, e.g., cables 35 and springs 39, see FIG. 2) that may be used to secure the device 10 to the bottom of a water environment.

Preferably, the frame 11 also includes a platform 14 which may be connected to the base 13 with connecting members 11a. The connecting members 11a preferably may be constructed from a corrosion resistant material, such as, for example, stainless steel. The connecting members 11a are configured and arranged to provide a space 16 for accommodating the piston 12. The platform 14 preferably is positioned above the water level, and the base 13, which preferably will remain submerged so that it will support the platform 14 at the desired level. According to a preferred embodiment, the connecting members may be configured as stainless steel tubular structures that preferably are watertight to further facilitate the buoyancy of the device 10.

A connection mechanism, shown comprising the piston rod or drive shaft 17, connects the piston 12 with the generator mechanism 101 to operate a generator. The drive shaft 17 is supported on the frame 11, and is illustrated passing through an aperture 18 of the platform 14. The drive shaft 17 is connected to the generator mechanism 101 to facilitate imparting rotation or movement of one or more elements of a generator 100. Preferably, the electrical generating device, such as the generator 100 is configured to be disposed above the level of the water in which the device 10 sits. According to preferred embodiments, the generator 100 may be supported on the platform 14, and is configured to remain at a level above the water's surface level so that maintenance of the generator 100 and other components may be facilitated. Though not shown, a housing may be provided to cover one or more of the components of the device 10 that are located on or above the platform.

Preferably, the piston 12 is configured to be weighted and is provided to drop within the frame 11 (when forces from waves are not otherwise acting on the bottom of the piston, or, e.g., are less than the piston weight). The piston 12 preferably is configured and arranged so that it is free to rise and fall with the ocean waves within the piston space 16 of the frame. However, when the action or force of water, such as a wave, acts upon the piston 12, the piston 12 preferably is moved, and may be raised within the frame 11. The tendency is for the raised piston 12 to return to a lowered position as the wave that lifted it recedes or moves away from the location of the device 10. The device 10 preferably is secured at a location of the water environment. A securing mechanism 21 (represented by the line 21 in the schematic of FIG. 1) is provided to secure the device 10 to the floor of a water environment, or an underwater structure (not shown).

Referring to FIG. 2, the securing mechanism 21 is shown comprising a preferred tethering arrangement including a plurality of cables 35. According to preferred configurations, each of the cables 35 includes a first section 36 that attaches to the frame 11 with a suitable fastener 37, and, more particularly, attaches to a post 11a of the frame 11. Each cable 35 also is shown having a second section 38 that attaches to the base 13 with a fastener 37. Preferably, a plurality of cables 35 are utilized, and, according to a preferred configuration shown in FIG. 2, four cables, one cable for each post 11a, are utilized. A force handling mechanism, such as the coil springs 39, preferably is used to secure the cables 35 to the ocean floor or structure. The coil springs 39 provide resilience to prevent the cable 35 from directly absorbing force impacts from abrupt movement of wave action, which might otherwise cause the cable 35 to break or one or more components connected to the cable 35 to loosen or become detached.

Though not shown in the other embodiments illustrated herein, securing means preferably are used to tether the ocean electricity generator devices illustrated in the alternate embodiments herein to a structure such as an ocean floor or other underwater structure in the same manner as shown in FIG. 2. Preferably, the ocean electricity generator devices described and illustrated herein are secured in a manner that permits the base 13 to remain below the water level while the platform 14 remains above the water level so that the water level of the ocean may act on the piston 12 (though it is understood that wave action may, at times, crest over the platform 14).

A preferred embodiment of an ocean electricity generating device 110 is shown in FIGS. 3A, 3B and 3C in conjunction with a generator mechanism 102 which is configured having a rack 31 and slide 32 for the rack 31 to travel along. The rack 31 preferably is connected to the drive shaft 17 for movement therewith. A suitable connecting member, such as, for example, the bracket 33, weld or other element, may be used to connect the rack 31 to the drive shaft 17. The frame 11 is shown formed with connecting members 11a which are tubular. The connecting members 11a connect the base 13 with the platform 14 and define the piston space 16 therebetween. The piston 12 is configured to ride between the tubular connecting members 11a. The movement of the piston 12 preferably is controlled with one or more stops 22, 23. The upper stops 23 preferably are configured as flanges provided on the connecting members 11a. The lower stop 22 preferably is configured as a structure supported by the tubular connecting members 11a and limits the downward displacement or travel of the piston 12 relative to the base 13. Preferably, the downward limit established by the stop 22 is designed to position the piston 12 at a distance from the base 13 so that wave action may act on the piston 12 to raise it within the frame 11. Similarly, the upper stops 23 are provided to limit the upward travel of the piston 12 to facilitate the return travel of the piston 12.

Figure 8:
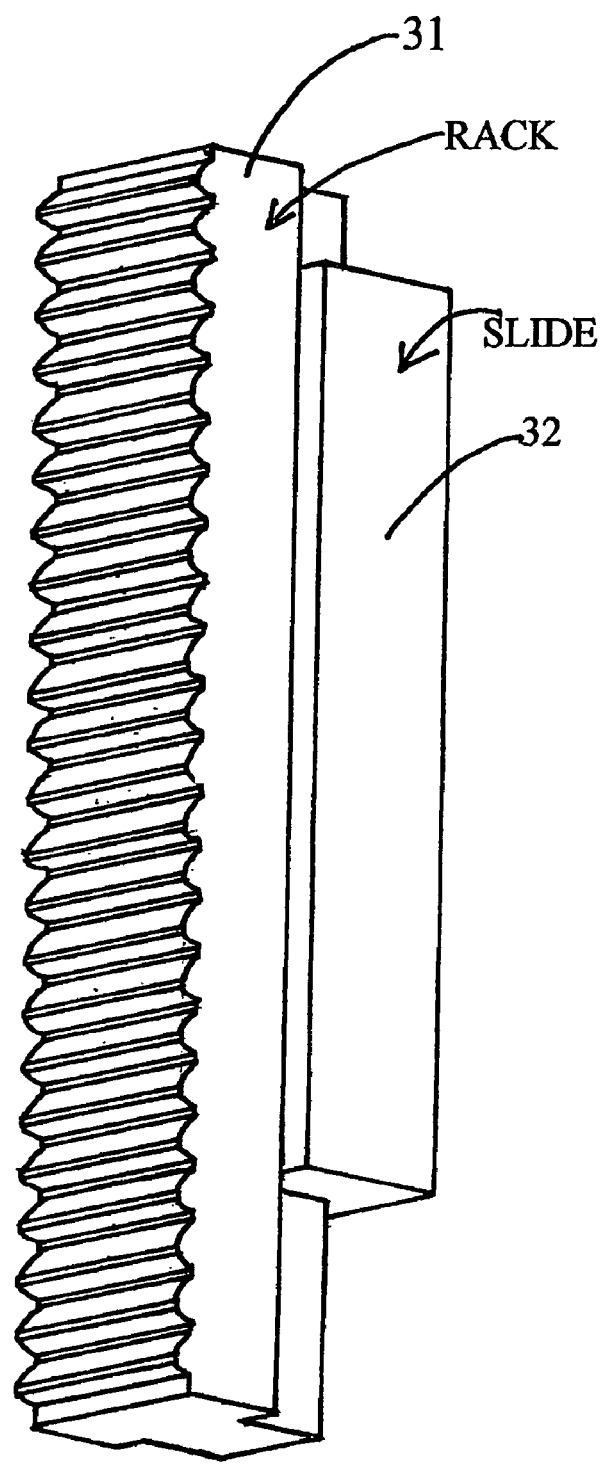
FIG. 8 is an illustration of a perspective view showing in partial view a preferred embodiment of a rack and slide component, shown separate from the other components of the ocean electricity generator.

The device 110 has a piston 12 which is connected to a drive shaft 17. The drive shaft 17 connects with the rack 31. A connecting member 33 connects the drive shaft 17 and rack 31. The drive shaft 17 and rack 31 may be supported on the platform 14. Preferably, the rack 31 is configured to slide upward and downward to correspond with the movement of the piston 12 that is connected thereto. The rack 31 preferably is supported on a slide 32 which provides a channel for the rack 31 to slide in. The movement of the rack 31 operates a generator mechanism 102 that imparts movement to drive a generator 111 to produce electricity. The pinion gears 43, 44 preferably are disposed to be rotated by the upward and downward movement of the gear rack 31 as rack 31 moves within the slide 32. A preferred configuration of the rack 31 and slide 32 is illustrated in FIG. 8 shown separately from the other components.

According to the preferred embodiment illustrated in FIGS. 3A, 3B and 3C, the device 110 is constructed having a rack stability tube 40 that has in interior space 41 for accommodating the rack 31 as the piston 12 is lowered from its upper position. The tube 40 is secured to the frame 11 with a securing mechanism, preferably the lower stop 22 which provides a stability structure for the tube 40. According to the preferred configuration, the piston 12 is provided with an aperture 42 which, preferably, is dimensioned so that the tube 40 may pass through the aperture 42. As the piston 12 travels, the tube 40 remains fixed and the piston 12 may move without interfering with the tube 40. The tube 40 is configured and positioned on the device 110 to receive the rack 31 when the rack 31 is lowered with the drive shaft 17 of the piston 12. Preferably, the slide 32 may be configured to so that a portion of the slide 32 is disposed within the tube space 41 to provide further stability for the rack 31 travel. Preferably, the platform 14 also has an aperture 14a to accommodate the rack 31 and possibly the slide 32 to permit the lowering of the rack 31. Preferably, the rack 31 passes through or makes a sealed connection with the tube 40.

An example of a preferred pinion gear arrangement is shown in connection with device 110 configured as a rotary generator mechanism 102 in FIGS. 3B and 3C. FIGS. 3A, 3B and 3C illustrate a preferred embodiment of the device 110 where the piston 12 is arranged to drive a rotary generator mechanism 102 to produce electricity. The gear rack 31 includes a first gear surface 34a and a second gear surface 34b (FIG. 3C). Pinion gears 43, 44 are configured to mesh with the respective first gear surface 34a and second gear surface 34b of the gear rack 31. The pinion gears 43, 44 are coupled with a transmission 45 to impart movement to the rotary generator 111 when the gear rack 31 is moved by the movement of the piston 12. The pinion gears 43, 44 are carried on drive shafts 46, 47. The drive shafts 46, 47 also carry transmission gears 48, 49. The transmission 45 preferably is arranged with a drive gear 51 that is carried on the generator drive shaft 52 that drives the generator 111. According to the preferred configuration illustrated in FIGS. 3A, 3B and 3C, the pinion gears 43, 44 are configured so that when one gear of the pinion gear pair 43, 44 is being driven by the movement of the gear rack 31, the other gear of the gear pair 43, 44 is freewheeling. A freewheeling clutch 53, 54 may be provided to control the gear rotation. The arrangement of gears 48, 49 and 51 of the transmission 45 imparts rotation to the generator drive shaft 52 in a single direction.

Referring to FIGS. 4A and 4B, a preferred embodiment of an ocean electricity generating device 210 is illustrated where the piston 12 is arranged to drive a start/stop rotary generator mechanism 200 that includes two rotary generators 201, in order to produce electricity. The components of the device 210 may be the same as those described herein, including the frame 11 and piston 12, base 13, platform 14, drive shaft 17 and tube 40. Stops 22, 23 for regulating the piston 12 travel also are shown, and may be constructed as previously described. The drive shaft 17 preferably is connected to the rack 31. The rack 31 may be provided to be guided along the slide 32. The components of the device 210 preferably may be the same as those described herein in connection with the device 110, except that a stop/start rotary generator mechanism 200 is utilized. A pinion gear 243 is connected to a drive shaft 246 that transmits the movement of the pinion gear 243 to operate a generator 201. The pinion gear 244 is similarly configured and is connected to a drive shaft 247 to drive another generator 201. The start/stop rotary generators 201 are illustrated in a preferred configuration and preferably may be supported on the platform 14 of the device 210. The pinion gears 243, 244 of the device 210 mesh with the rack 31 gear surfaces 34a, 34b, respectively, in the same manner as shown in FIG. 3C in connection with the embodiment of the device 110, so that the rotation of the pinion gears 243, 244, drives the generators 201. The generators 201 preferably are supported on the device 210, and, more particularly, according to a preferred embodiment, may be supported on the platform 14. The rotation of the pinion drive shafts 246, 247 by the drive components produces electricity, which may be transferred by a power cable 29 (see FIG. 1) to a location remote from the device 210 such as, for example, a power grid (not shown).

Figure 5C:
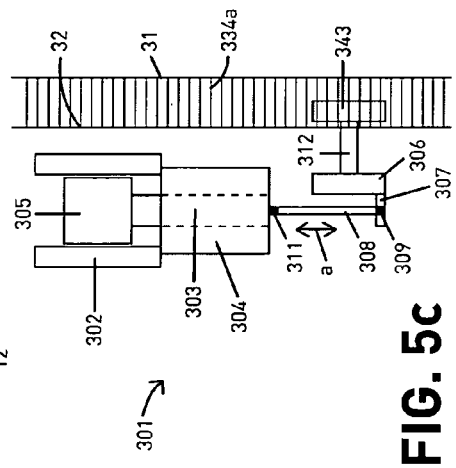
FIG. 5C is an enlarged front elevation view of the ocean electricity generator shown in FIG. 5A showing the linear generator components, a rack in partial view, and a pinion separate from the other components of the device.
Figure 5A:
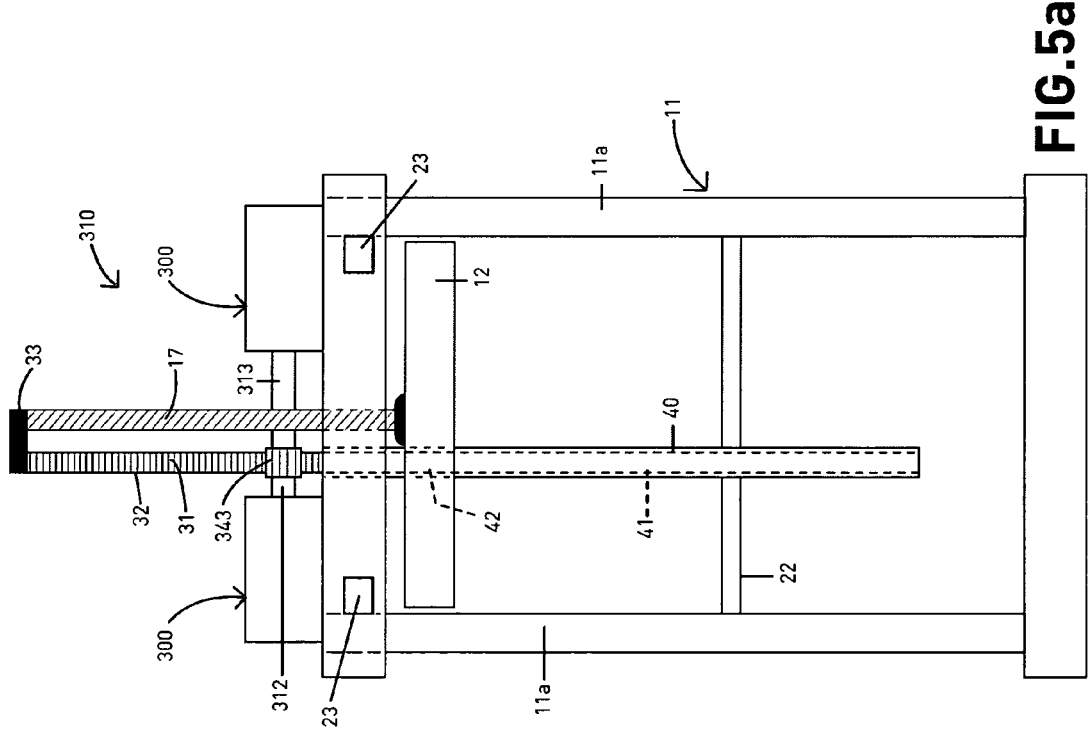
FIG. 5A is a front elevation view of another preferred alternate embodiment of an ocean electricity generator according to my invention.

Referring to FIGS. 5A, 5B and 5C an ocean electricity generator 310 is shown with a generator mechanism 300 comprising a pair of linear generators 301. The linear generators 301 each includes a stator 302 and a drive mechanism which includes a drive shaft 303, a stabilizer 304 and a stator piston 305. A cam 306 with an offset drive pin 307 is provided for linking the pinion 343 with the pinion shaft 312. Similarly, the pinion shaft 313 is configured to drive another of the pairs of linear generators 301. A connection mechanism is illustrated for connecting the cam 306 with the generator drive shaft 303. The connection mechanism preferably may include a crankshaft 308 with a bearing connection 309 made at the cam pin 307 and a wrist pin connection linkage 311 made at the generator drive shaft 303. Accordingly, each linear generator 301 illustrated in this embodiment may be configured to operate in this manner. As the rack 31 travels along the slide 32, the pinions 343, 344 are rotatably driven by the movement of the rack gear surface 334a, and in turn, rotate the cam 306 and cause the offset pin 307 to move the crankshaft 308 back and forth in a generally linear direction represented by arrow "a" in FIG. 5C.

FIGS. 6A and 6B illustrate an alternate embodiment of an ocean electricity generator 410 according to my invention, showing a piston 412 having two apertures 442a and 442b disposed therein, and two tubes 440a and 440b. The piston 42 may be constructed as discussed in connection with the piston 12, but with a second aperture 442b. Similarly, the platform 14 has two apertures 14a, 14b. The other components of the device 410 may be configured as described herein in connection with the devices 10, 110, 210 and 310, including the frame 11, tubes 11a, base 13 and stops 23. A connector 433 connects the drive shaft 17 with the racks 431a, 431b. The stop and stability structure 422 preferably is constructed similar to the stop 22, but secures both tubes 440a, 440b.

According to the embodiment illustrated in FIGS. 6A and 6B, a linear generator system 400 is illustrated, and though not shown in FIGS. 6A and 6B, may include the components shown and described in connection with the linear generating mechanism of FIGS. 5A, 5B and 5C. However, the embodiment of the device 410 provides two racks 431a, 431b, and two slides 432a, 432b. The racks 431a, 431b preferably are connected to the drive shaft 17, and, as described herein in connection with the embodiments 110, 210 and 310, travel downward into the tubes 440a, 440b, respectively, when the piston 12 is lowered and the drive shaft 17 travels downward as a result thereof. The racks 431a, 431b, preferably have gear surfaces 434a, 434b, respectively, that drive the pinion gears 443, 444, which are connected to the pinion shafts 412a, 412b.

Referring to FIG. 7A and FIG. 7B, a preferred embodiment of the device 510 is illustrated where the piston is arranged to drive a rotary start/stop (change direction for each time the piston changes direction) mechanism 201 which is a rotary generator to produce electricity. The components of the device 510 may be the same as those described herein in connection with the device 410 shown in FIGS. 6A and 6B, except that instead of linear generators 400, rotary start/stop generators are used. The device 210, includes a frame 11, a piston 412, a float base 13, a platform 14 and a drive shaft 17. Stops 22, 23 for regulating the piston 412 travel also are shown. The drive shaft 17 preferably carries the racks 431a, 431b thereon, and may be constructed as described herein and shown in connection with FIGS. 6A and 6B. The racks 431a, 431b may be provided to be guided along slides 432a, 432b. Pinion gears 243, 244 are connected to driving shafts 246, 247, respectively that transmit the movement of the pinion gears 243, 244 to operate rotary start/stop generators 201.

Figure 9B:
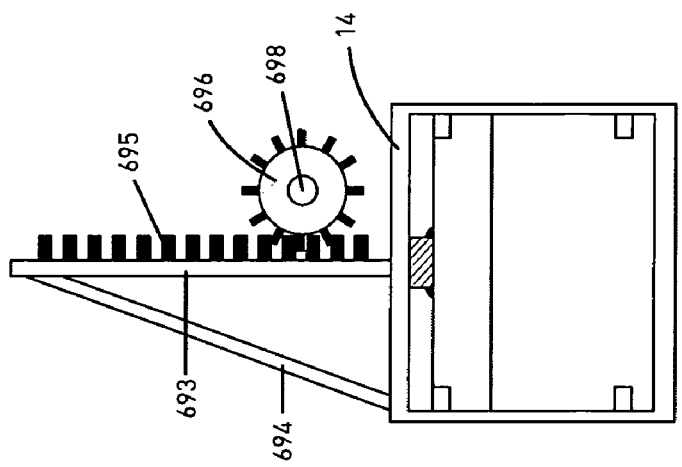
FIG. 9B is a left side elevation view showing the engagement of the flat gear and round gear in a view separate from the other components of the ocean electricity generator and with the generator shaft being shown in a sectional view.
Figure 9A:
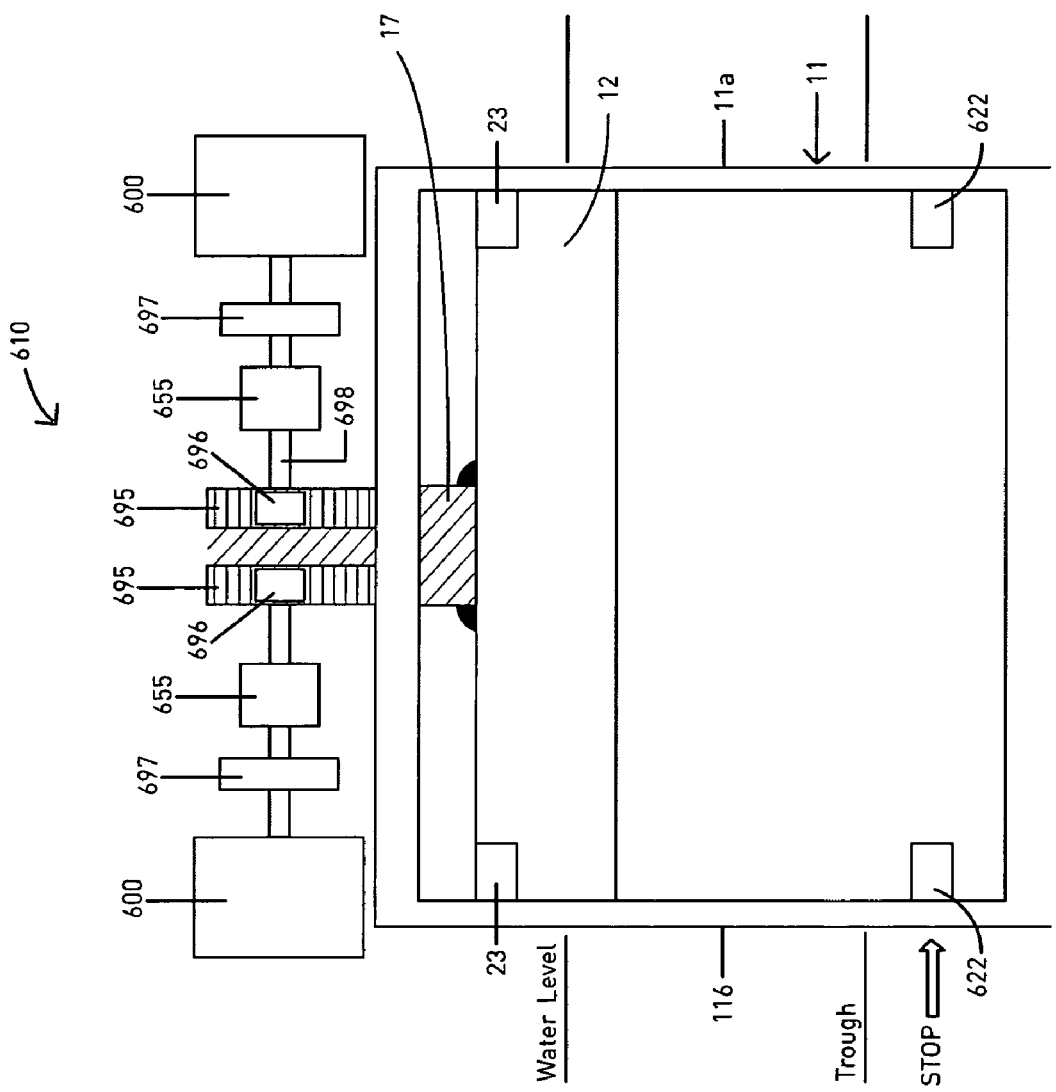
FIG. 9A is a front elevation view of an alternate embodiment of an ocean electricity generator configured as a mule generator.

An alternate embodiment of an ocean generator device 610 is illustrated in FIGS. 9A and 9B where the piston 12 is arranged to move a flat gear 695 up and down and a round gear 696 is provided to be driven by the movement of the flat gear 695. The device 10 also includes a transmission, which may be constructed the same as the transmission 45 described herein (in connection with FIG. 3), and is shown with a flywheel 697 and generator shaft 698. A generator 600 is provided and the rotation of the generator shaft 698 generates electricity. As is illustrated, the piston 12 is shown in accordance with a preferred embodiment of the device 610 having the drive shaft 17 being configured to carry a flat gear 695 on each side of the drive shaft 17. This piston 12 is arranged to travel between the upper stops 23 and lower stops 623. A mirror image arrangement of the round gear 696, transmission 655, flywheel 697 and generator 600 are shown inverted on the left side of the drive shaft 17 so that the movement of the piston 12 upward and downward may, in accordance with a preferred configuration, operate two generators. FIG. 9B illustrates an example of the gear engagement showing the flat gear 695 and a round gear 696. A support 694 is also illustrated in FIG. 9B and may be connected to and supported by the frame 11 and more particularly the platform 14. A slide 693 may also provide support for the flat gear 695 to move along and, may be supported on the frame 11 and in particular platform 14. The components work together with the piston 12 traveling upward as a result of rising waves acting upon it. The upward travel of the piston 12 also pushes upward the flat gear 695 which is in engagement with the round gear 696 to turn the generator shaft 698, the transmission 655 and in turn the generator 600. According to the preferred embodiment illustrated in FIGS. 9A and 9B, when the piston 12 is traveling upward, one of the transmissions 655 would be engaged and when the piston is traveling downward as a result of the wave subsiding, the transmission would be in the "free wheeling" position while the other transmission 655 is operating in the opposite manner. The generator shaft 698 would reverse each time the piston 12 changes direction. The generator shafts 698 which are illustrated extending to each of the generators 600 are designed to and arranged to rotate in the same direction as a result of the transmission 655. A flywheel 697 preferably is attached to the shafts prior to the shaft being received in the generator 600. The flywheel preferably keeps the shafts 698 rotating when the flat gear 695 is moving in the opposite direction. In other words, the free wheeling transmission 655 allows the flat gear 695 to turn the round gear 696 in the opposite direction without affecting the direction of the shaft 698 that drives the generator 600. According to the preferred arrangement shown in FIGS. 9A and 9B the piston 12 utilizes the upward direction for driving one of the generators 600 and the downward direction to drive the other of the generators 600.

In the embodiments illustrated, the ocean waves preferably drive the piston 12 in an upward direction and the weight of the piston 12 is able to drop down when the wave ceases acting upon it so that the drive shaft 17 may move upward and downward and have that motion translated to drive a generator mechanism. Preferably the generator mechanisms including the generators are supported on the frame 11 and more preferably on the platform 14.

Though not shown in the other embodiments illustrated in FIGS. 3-9, securing means preferably are used to tether the ocean electricity generator devices to a structure such as an ocean floor or other underwater structure. Preferably, the ocean electricity generator devices are secured in a manner that permits the base 13 to remain below the water level and the platform to remain above the water level so that the water level of the ocean may act on the piston 12.

According to a preferred configuration, the frame 11 may be constructed so that the piston 12 may travel about twenty feet. The piston 12 may be configured with a width or diameter of about twenty (20) feet. The length of the space below the lower point of the piston travel (e.g., at the upper piston stops 23) may be about twenty (20) feet from the base 13. According to a preferred embodiment, the float base 13 may be more than 25 feet wide and the platform more than 24 feet wide. The drive shaft 17 may be about 24 feet and the length of the rack may be about twenty feet. These dimensions provide space for the piston 11 to travel and the wave action to act on the piston 11, and the drive shaft and rack to operate the generator. The size of the device and its components, including the weight, height and other dimensions, may be constructed in relation to the location that the device is to be placed, the generator and capacity of electricity that is to be generated, or both considerations. For example, if the device is to be placed in a water environment, such as an ocean with vigorous wave action, the device may be constructed of stronger materials, or where the ocean waves are typically high, the device may be constructed with a frame and piston height to take advantage of the wave crest height or amplitude.

Although not shown, a lubrication system preferably is provided to provide lubrication to one or more of the components, including the drive shaft 17, and the racks and slides. In addition, a bushing may be provided in the platform aperture 18 to facilitate sliding of the drive shaft 17.

Although the devices are illustrated and described with the piston oriented vertically, the piston may be arranged in other directions, including angular or horizontal. Though the securing mechanism is illustrated using an arrangement of cables, other securing mechanisms may be used to secure the device to the floor of the water environment.

According to an alternate embodiment, the devices may be configured to be secured to a structure, such as, for example an ocean oil rig. For example, embodiments may be constructed where one or more components of the device, such as the frame 11 (e.g., base 13, platform, tubes 11*a*) may be attached to a rig structure so that waves may move the piston 12 upward and the piston 12 may travel downward, and in turn drive the drive shaft 17 (during the piston upward and downward travel) to generate electricity when connected to a generator mechanism as described herein.

Another alternate embodiment of the device may utilize the drive shaft movement in an arrangement with one or more other components, such as, for example, a pump mechanism or pump, to pump water to a destination. These alternate embodiments include, for example, utilizing an ocean water pump, which may be configured and arranged to operate as the generators and generator mechanisms described herein. The water could be pumped from the location of the device to a remote destination such as a reservoir on shore. According to alternate embodiments, the purpose may include a place for stored energy for later use electricity and/or desalination.

While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. An ocean electricity generator apparatus comprising:
   a frame configured for placement in a water environment wherein the frame comprises a stabilizing member, wherein the stabilizing member comprises a base, wherein the base comprises a float base; and
   a piston held on said frame and being configured and arranged for movement,
   the piston being adapted to connect with a generator to generate electricity through the movement of the piston, the piston being held on the frame so that the piston may be moved by the water environment;
   a generator mechanism including a rack,
   wherein the piston has an aperture therein for accommodating the travel of the rack.

2. The generator apparatus of claim 1, wherein the frame further comprises a platform.

3. The generator apparatus of claim 2, wherein the base and platform are spaced apart, the apparatus including connecting means for connecting the base with said platform.

4. The generator apparatus of claim 3, wherein said connecting means comprises connecting members connecting said base with said platform.

5. The generator apparatus of claim 4, wherein said connecting members are configured to provide a space for accommodating the piston.

6. The generator apparatus of claim 5, wherein a connection mechanism connects the piston with the generator.

7. The generator apparatus of claim 6, wherein the connection mechanism comprises a drive shaft.

8. The generator apparatus of claim 6, wherein the connection mechanism includes a rack and a pinion, wherein the rack is carried by a drive shaft that is connected to the piston, and wherein the pinion is disposed for movement along the rack.

9. The generator apparatus of claim 8, wherein the gear rack includes a first gear surface and a second gear surface, and wherein drive gears are configured to mesh with the respective first gear surface and second gear surface of the gear rack, the drive gears being coupled with a transmission to impart movement to a generator when the gear rack is moved.

10. The generator apparatus of claim 5 wherein the connecting members comprise tubes and wherein the piston is configured to ride between the tubes.

11. The apparatus of claim 1, further comprising a pump for pumping water from the apparatus to a remote destination, said pump being driven by said piston.

12. An ocean electricity generator apparatus comprising:
a frame configured for placement in a water environment; and
a piston held on said frame and being configured and arranged for movement,
the piston being adapted to connect with a generator to generate electricity through the movement of the piston, the piston being held on the frame so that the piston may be moved by the water environment;
wherein the frame comprises a stabilizing member;
wherein the stabilizing member comprises a base;
wherein the base comprises a float base;
wherein the frame further comprises a platform;
wherein the base and platform are spaced apart, the apparatus including connecting means for connecting the base with said platform;
wherein said connecting means comprises connecting members connecting said base with said platform;
wherein said connecting members are configured to provide a space for accommodating the piston;
wherein a connection mechanism connects the piston with the generator;
wherein the connection mechanism includes a rack and a pinion, wherein the rack is carried by a drive shaft that is connected to the piston, and wherein the pinion is disposed for movement along the rack; and
wherein the piston has an aperture therein for accommodating the travel of the rack.

13. The generator apparatus of claim 12, including a tubular member carried on the frame and arranged to pass through the piston aperture of the tubular member being configured to receive at least a portion of the rack therein when the rack is lowered.

14. The generator apparatus of claim 12, further comprising a second tubular member, and wherein the piston includes a second aperture.

15. The generator apparatus of claim 14, wherein the generator comprises a linear generator arranged with a translation member and a stator piston, and wherein a cam with an offset connection is provided for linking the pinion with the drive shaft of the stator piston.

16. The generator apparatus of claim 15, wherein the translation member comprises a drive shaft and a stabilizer disposed in conjunction with the drive shaft.

17. The generator apparatus of claim 15, wherein the generator comprises a rotary generator.

18. The generator apparatus of claim 12, further including a lubrication system.

* * * * *